US011169671B2

(12) United States Patent
Ellsworth et al.

(10) Patent No.: US 11,169,671 B2
(45) Date of Patent: Nov. 9, 2021

(54) ALTERATION OF A SOURCE DATA VISUALIZATION BASED ON USER INPUT

(71) Applicant: Lucid Software, Inc., South Jordan, UT (US)

(72) Inventors: Kevin Ellsworth, South Jordan, UT (US); Joe Stack, South Jordan, UT (US); Austin Row, South Jordan, UT (US); Jonathan Bronson, South Jordan, UT (US); Ruturaj Eksambekar, South Jordan, UT (US); Tyler Davis, South Jordan, UT (US); Alex Williams, South Jordan, UT (US)

(73) Assignee: LUCID SOFTWARE, INC., South Jordan, UT (US)

( * ) Notice: Subject to any disclaimer, the term of this patent is extended or adjusted under 35 U.S.C. 154(b) by 0 days.

(21) Appl. No.: 16/697,004

(22) Filed: Nov. 26, 2019

(65) Prior Publication Data

US 2021/0157461 A1    May 27, 2021

(51) Int. Cl.
*G06F 3/0484* (2013.01)
*G06F 16/26* (2019.01)
(Continued)

(52) U.S. Cl.
CPC ............ *G06F 3/0484* (2013.01); *G06F 16/26* (2019.01); *G06F 16/444* (2019.01); *H04L 41/085* (2013.01); *H04L 41/14* (2013.01)

(58) Field of Classification Search
CPC ........ G06F 3/0484; G06F 16/444; G06F 8/38; G06F 16/26; H04L 41/14; H04L 41/085
See application file for complete search history.

(56) References Cited

U.S. PATENT DOCUMENTS

| 5,414,809 A | 5/1995 | Hogan |
| 6,636,250 B1 | 10/2003 | Gasser |

(Continued)

FOREIGN PATENT DOCUMENTS

| JP | 2004-252539 A | 9/2004 |
| JP | 2006-526840 | 11/2006 |

(Continued)

OTHER PUBLICATIONS

PCT/US2018/017105 International Search Report and Written Opinion, dated Apr. 6, 2018 (22 pgs).

(Continued)

*Primary Examiner* — Roberto Borja
(74) *Attorney, Agent, or Firm* — Maschoff Brennan

(57) ABSTRACT

A method may include displaying, via a display screen, a visualization of data within a user interface (UI). The data may include multiple layers of information. The method may include receiving, via the UI, a first user input effective to select portions of the data to be included in the visualization of the data displayed within the UI. The method may include receiving, via the UI, a second user input effective to select one or more subsets of the layers of information to be included in the visualization displayed within the UI. The method may include altering the visualization of the data within the UI based on the first user input and according to the second user input. The visualization of the data may be altered by hiding one or more subsets of the layers of information that are not to be included in the visualization displayed within the UI.

17 Claims, 8 Drawing Sheets

(51) Int. Cl.
*G06F 16/44* (2019.01)
*H04L 12/24* (2006.01)

(56) References Cited

U.S. PATENT DOCUMENTS

| | | | |
|---|---|---|---|
| 6,982,708 | B1 | 1/2006 | Mah et al. |
| 7,149,975 | B1* | 12/2006 | Johnson ................ H04L 41/22 |
| | | | 715/734 |
| 7,800,613 | B2 | 9/2010 | Hanrahan et al. |
| 8,364,820 | B2 | 1/2013 | Madani et al. |
| 8,375,068 | B1 | 2/2013 | Platt et al. |
| 8,694,906 | B2 | 4/2014 | Cole et al. |
| 8,788,931 | B1 | 7/2014 | Chen et al. |
| 9,201,558 | B1 | 12/2015 | Dingman et al. |
| 9,619,827 | B1 | 4/2017 | Joneja |
| 9,633,076 | B1 | 4/2017 | Morton |
| 9,684,761 | B1 | 6/2017 | Lamant |
| 9,922,108 | B1 | 3/2018 | Meiklejohn et al. |
| 10,114,884 | B1 | 10/2018 | Valensi et al. |
| 10,175,854 | B2 | 1/2019 | Ramanathan et al. |
| 10,616,078 | B1 | 4/2020 | Thomas |
| 10,684,998 | B2 | 6/2020 | Ardila et al. |
| 2002/0059183 | A1 | 5/2002 | Chen |
| 2004/0168115 | A1 | 8/2004 | Bauernschmidt et al. |
| 2005/0179684 | A1* | 8/2005 | Wallace ................ G06T 11/206 |
| | | | 345/419 |
| 2007/0214179 | A1 | 9/2007 | Hoang |
| 2008/0306985 | A1 | 12/2008 | Murray et al. |
| 2009/0299920 | A1 | 12/2009 | Ferris et al. |
| 2009/0313576 | A1 | 12/2009 | Neumann et al. |
| 2010/0005386 | A1 | 1/2010 | Verma et al. |
| 2010/0153340 | A1 | 6/2010 | Yasrebi |
| 2011/0016099 | A1 | 1/2011 | Peer et al. |
| 2011/0055756 | A1 | 3/2011 | Chen et al. |
| 2011/0078171 | A1 | 3/2011 | Wagenblatt et al. |
| 2011/0109472 | A1 | 5/2011 | Spirakis et al. |
| 2011/0179370 | A1 | 7/2011 | Cardno et al. |
| 2011/0239164 | A1 | 9/2011 | Saraiya et al. |
| 2011/0261049 | A1 | 10/2011 | Cardno et al. |
| 2011/0290348 | A1 | 12/2011 | Miyazawa et al. |
| 2011/0295865 | A1 | 12/2011 | Carroll et al. |
| 2011/0295999 | A1 | 12/2011 | Ferris et al. |
| 2012/0226808 | A1 | 9/2012 | Morgan |
| 2013/0031143 | A1 | 1/2013 | Ktiyar |
| 2013/0097544 | A1 | 4/2013 | Parker et al. |
| 2013/0232452 | A1 | 9/2013 | Krajec et al. |
| 2013/0304925 | A1 | 11/2013 | Ferris et al. |
| 2014/0006421 | A1 | 1/2014 | Van Ham |
| 2014/0071138 | A1 | 3/2014 | Gibson et al. |
| 2014/0181718 | A1* | 6/2014 | Gao ...................... G06F 3/0484 |
| | | | 715/771 |
| 2014/0195515 | A1 | 7/2014 | Baker et al. |
| 2014/0208215 | A1 | 7/2014 | Deshpande |
| 2014/0244627 | A1 | 8/2014 | Bhatia |
| 2014/0258446 | A1 | 9/2014 | Bursell |
| 2014/0278808 | A1 | 9/2014 | Lyoob et al. |
| 2014/0324710 | A1 | 10/2014 | Thibout et al. |
| 2014/0365655 | A1 | 12/2014 | Takahashi et al. |
| 2015/0019301 | A1 | 1/2015 | Jung et al. |
| 2015/0019569 | A1 | 1/2015 | Parker et al. |
| 2015/0294488 | A1 | 10/2015 | Iwasaki et al. |
| 2015/0312421 | A1 | 10/2015 | Leemet et al. |
| 2015/0339379 | A1 | 11/2015 | Inagaki |
| 2015/0365299 | A1* | 12/2015 | Schaerges ............... G06Q 10/06 |
| | | | 715/736 |
| 2016/0034835 | A1 | 2/2016 | Levi et al. |
| 2016/0042252 | A1 | 2/2016 | Sawhney et al. |
| 2016/0042253 | A1 | 2/2016 | Sawhney et al. |
| 2016/0070451 | A1 | 3/2016 | Kim et al. |
| 2016/0070541 | A1 | 3/2016 | Lee |
| 2016/0112277 | A1* | 4/2016 | Nagarajan ............... H04J 14/02 |
| | | | 715/736 |
| 2016/0162598 | A1* | 6/2016 | Schaerges ............... G06F 16/86 |
| | | | 715/853 |
| 2016/0371312 | A1 | 12/2016 | Ben-Aharon et al. |
| 2017/0031958 | A1 | 2/2017 | Miller |
| 2017/0132300 | A1 | 5/2017 | Sekar |
| 2017/0228447 | A1 | 8/2017 | Catania et al. |
| 2017/0293415 | A1 | 10/2017 | Mackinlay et al. |
| 2017/0351753 | A1 | 12/2017 | Duncker et al. |
| 2018/0039657 | A1 | 2/2018 | Pandit |
| 2018/0067998 | A1 | 3/2018 | Sherman et al. |
| 2018/0091579 | A1 | 3/2018 | Thomas |
| 2018/0121482 | A1 | 5/2018 | Heen et al. |
| 2018/0150436 | A2 | 5/2018 | Ben-Aharon et al. |
| 2018/0173790 | A1 | 6/2018 | Krishnamacharya |
| 2018/0189330 | A1 | 7/2018 | Doan et al. |
| 2018/0196863 | A1 | 7/2018 | Meiklejohn et al. |
| 2018/0232340 | A1 | 8/2018 | Lee |
| 2018/0337794 | A1 | 11/2018 | Casaletto et al. |
| 2019/0012736 | A1 | 1/2019 | Courbage et al. |
| 2019/0018904 | A1 | 1/2019 | Russell et al. |
| 2019/0129968 | A1 | 5/2019 | Neylan et al. |
| 2019/0213099 | A1 | 7/2019 | Schmidt et al. |
| 2019/0286620 | A1 | 9/2019 | Al-Haimi et al. |
| 2019/0294473 | A1 | 9/2019 | Martin et al. |
| 2019/0340038 | A1 | 11/2019 | Molloy et al. |
| 2019/0384836 | A1 | 12/2019 | Roth et al. |
| 2020/0004865 | A1 | 1/2020 | Dilts et al. |
| 2020/0004866 | A1 | 1/2020 | Dilts et al. |
| 2020/0004872 | A1 | 1/2020 | Dilts et al. |

FOREIGN PATENT DOCUMENTS

| | | |
|---|---|---|
| JP | 2016-085761 A | 5/2016 |
| KR | 10-2015-0031502 | 3/2015 |
| WO | 2012-118726 A2 | 9/2012 |
| WO | 2018/145112 A1 | 8/2014 |

OTHER PUBLICATIONS

International Search Report and Written Opinion issued in PCT Application No. PCT/US2019/040001, dated Oct. 24, 2019.

International Search Report and Written Opinion issued in PCT Application No. PCT/US2019/040004, dated Oct. 24, 2019.

International Search Report and Written Opinion issued in PCT Application No. PCT/US2019/040006, dated Oct. 24, 2019.

Office Action issued in U.S. Appl. No. 16/024,533, filed Mar. 18, 2020.

Office Action issued in U.S. Appl. No. 16/024,551, filed Apr. 2, 2020.

How to Use ViewModel in Asp. Net MVC with Example, by Tutlane, archived on Archive.org on Oct. 26, 2017. https://web.archive.org/web/20171026085504/https://www.tutlane.com/tutorial/aspnet-mvc/how-to-use-viewmodel-in-asp-net-mvc-with-example. (Year: 2017).

Single ASP.NET MVC application using multiple databases, by Adriano Silva, StackOverflow, Mar. 22, 2012, https://stackoverflow.conn/questions/9823330/single-asp-net-mvc-application-using-multiple-databases. (Year: 2012).

Refresh table using AJAX in ASP.NET MVC by Voila Daniel, StackOverflow, Jul. 28, 2016, https://stackoverflow.com/questions/38635966/refresh-table-using-ajax-in-asp-net-mvc. (Year: 2016).

Upload and Read CSV File in ASP.NET MVC, by TechBrij, Jan. 17, 2015, https://techbrij.com/read-csv-asp-net-mvc-file-upload. (Year: 2015).

International Search Report and Written Opinion issued in PCT Application No. PCT/US2020/018343, dated Jun. 23, 2020.

International Search Report and Written Opinion issued in PCT Application No. PCT/US2020/036239, dated Sep. 11, 2020.

Office Action issued in U.S. Appl. No. 16/024,544, dated Jun. 23, 2020.

Office Action issued in U.S. Appl. No. 16/024,533, dated Jul. 2, 2020.

Office Action issued in U.S. Appl. No. 16/024,551, dated Aug. 10, 2020.

PCT International Search Report and Written Opinion issued in corresponding application No. PCT/US2020/062437, dated Mar. 19, 2021.

(56) References Cited

OTHER PUBLICATIONS

PCT International Search Report and Written Opinion issued in corresponding application No. PCT/US2020/062438, dated Mar. 23, 2021.
Notice of Allowance issued in corresponding U.S. Appl. No. 16/024,533, dated Oct. 20, 2020.
Notice of Allowance issued in corresponding U.S. Appl. No. 16/024,544, dated Sep. 30, 2020.
Office Action issued in corresponding U.S. Appl. No. 16/445,040, dated Feb. 19, 2021.
Office Action issued in corresponding U.S. Appl. No. 16/696,998, dated Feb. 8, 2021.
Office Action issued in corresponding U.S. Appl. No. 16/024,551, dated Jan. 14, 2021.
Notice of Allowance issued in corresponding U.S. Appl. No. 16/445,040, dated May 27, 2021.
Final Office Action issued in corresponding U.S. Appl. No. 16/024,551, dated May 12, 2021.

\* cited by examiner

ALTERATION OF A SOURCE DATA VISUALIZATION BASED ON USER INPUT

FIELD

The embodiments discussed in the present disclosure are related to alteration of a source data visualization based on user input.

BACKGROUND

Unless otherwise indicated in the present disclosure, the materials described in the present disclosure are not prior art to the claims in the present application and are not admitted to be prior art by inclusion in this section.

Many entities use a cloud infrastructure maintained by a cloud service provider for performance of cloud processing activities. However, representation of which components of the cloud infrastructure are being used and in which capacities are often very difficult to interpret.

The subject matter claimed in the present disclosure is not limited to implementations that solve any disadvantages or that operate only in environments such as those described above. Rather, this background is only provided to illustrate one example technology area where some implementations described in the present disclosure may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some embodiments described in the present disclosure generally relate to altering a visualization of source data based on user input.

In an example embodiment, a method to alter a visualization of source data based on user input within a user interface may include displaying, via a display screen, a visualization of source data within the user interface. The source data may include multiple layers of information. The method may also include receiving, via the user interface, a first user input. The first user input may be effective to select portions of the source data to be included in the visualization displayed within the user interface. In addition, the method may include receiving, via the user interface, a second user input. The second user input may be effective to select one or more subsets of the layers of information to be included in the visualization displayed within the user interface. Further, the method may include altering the visualization of the source data within the user interface. The visualization of the source data may be altered based on the first user input and according to the second user input. The visualization of the source data may be altered by hiding one or more portions of the source data and one or more subsets of the layers of information that are not to be included in the visualization displayed within the user interface.

In another example embodiment, a non-transitory computer-readable storage medium has computer-executable instructions stored thereon that are executable by a processor device to perform or control performance of operations that may include displaying, via a display screen, a visualization of source data within a user interface. The source data may include multiple layers of information. The operations may also include receiving, via the user interface, a first user input. The first user input may be effective to select portions of the source data to be included in the visualization of the source data displayed within the user interface. In addition, the operations may include receiving, via the user interface, a second user input. The second user input may be effective to select one or more subsets of the plurality of layers of information to be included in the visualization of the source data displayed within the user interface. Further, the operations may include altering the visualization of the source data within the user interface. The visualization of the source data may be altered based on the first user input and according to the second user input. The visualization of the source data may be altered by hiding one or more portions of the source data and one or more subsets of the layers of information that are not to be included in the visualization displayed within the user interface.

In yet another example embodiment, a system including a processor configured to cause performance of operations that may include displaying, via a display screen, a visualization of source data within a user interface. The source data may include multiple layers of information. The operations may also include receiving, via the user interface, a first user input. The first user input may be effective to select portions of the source data to be included in the visualization of the source data displayed within the user interface. In addition, the operations may include receiving, via the user interface, a second user input. The second user input may be effective to select one or more subsets of the plurality of layers of information to be included in the visualization of the source data displayed within the user interface. Further, the operations may include altering the visualization of the source data within the user interface. The visualization of the source data may be altered based on the first user input and according to the second user input. The visualization of the source data may be altered by hiding one or more portions of the data and one or more subsets of the layers of information that are not to be included in the visualization displayed within the user interface.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Figure 1:
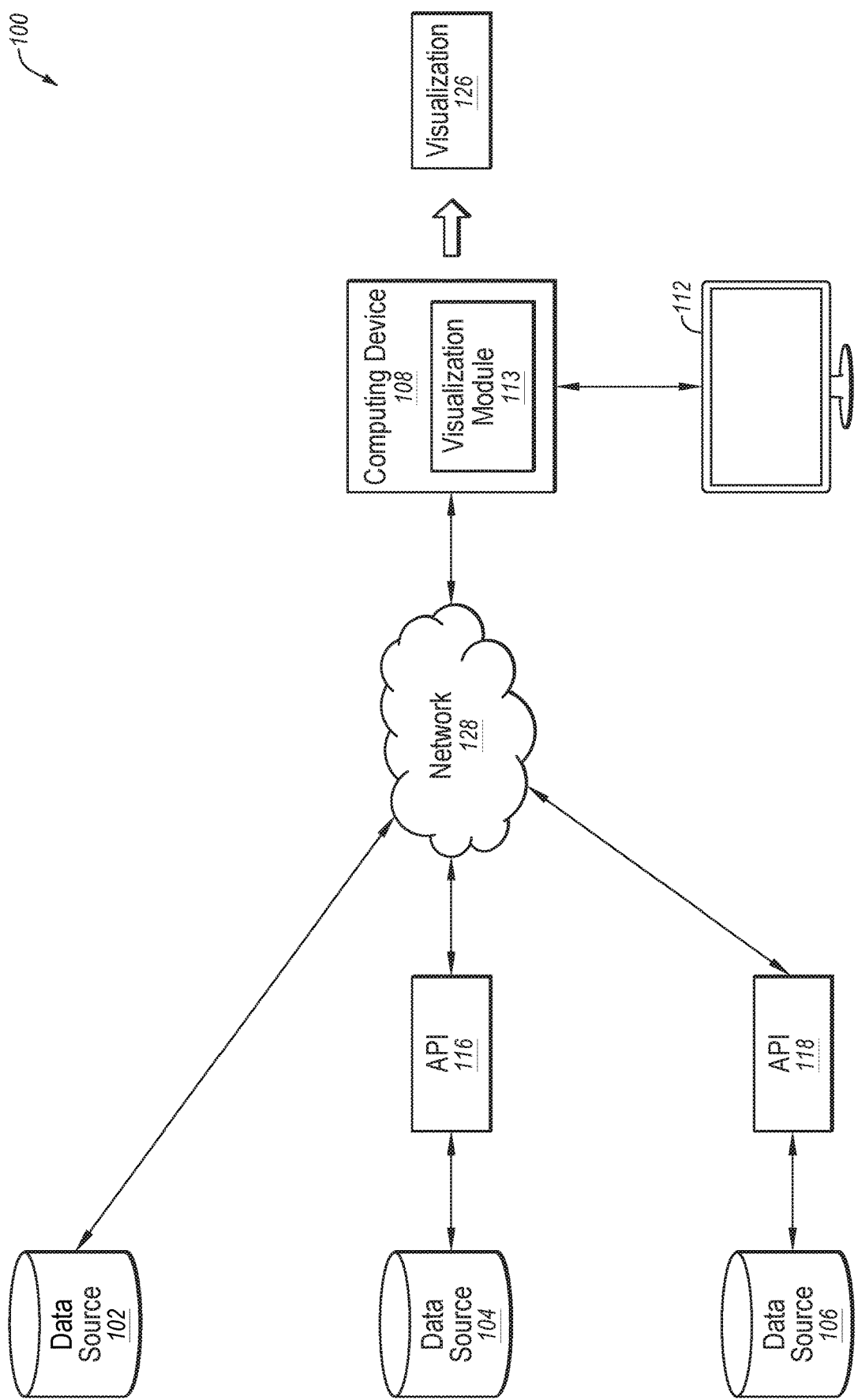
FIG. 1 is a block diagram of an example environment to alter a visualization of source data from data sources.

In some embodiments, source data representative of cloud infrastructures may be obtained from one or more cloud infrastructure providers. In these and other embodiments, the source data may be obtained from data sources maintained by the cloud infrastructure providers. In other embodiments, the source data may be obtained from data sources maintained by third-party entities. Example cloud infrastructure providers may include Amazon Web Services (AWS), Google Cloud, and Microsoft Azure. In some embodiments, the source data may be obtained from the user or data sources maintained by the user. In these and other embodiments, the source data may include data representative of a cloud infrastructure that the user selected using a cloud infrastructure selection tool.

The source data may include information describing hardware components and software components (generally referred to as "components") within the cloud infrastructure. Example hardware components and software components may include servers, data storage devices, communication networks (e.g., subnets), virtual private clouds (VPCs), and any other appropriate back-end component for implementing the cloud infrastructure. In some embodiments, the user may use the source data to select a particular cloud infrastructure for cloud computing activities that are associated with the user. In other embodiments, the user may select a particular service of the cloud infrastructure, and pre-determined components of the cloud infrastructure may be used for the cloud computing activities associated with the user. The pre-determined components may be associated with the particular service of the cloud infrastructure selected by the user. For example, the particular cloud infrastructure may be selected for cloud computing activities associated with retail services provided by the user.

The source data may also include containment information describing relationships between the various components of the cloud infrastructure. In some embodiments, the relationships between the various components of the cloud infrastructure may indicate relations general relationships between the various components such as communicative coupling, physical proximity, or any other appropriate relationship. In other embodiments, the relationships between the various components of the cloud infrastructure may indicate relationships for the particular service selected by the user. Additionally or alternatively, the containment information may include information describing regions of availability zones (e.g., data centers) or any other appropriate relationship between the various components. Further, the source data may include information describing security groups (e.g., firewall rules) of the various components.

A visualization of the source data (e.g., visualization) including multiple objects, connections, and/or information may be generated and displayed via a graphical user interface (GUI). Each object included in the visualization may be representative of a component described in the source data. Further, each connection included in the visualization may be representative of a relationship between two or more components in the cloud infrastructure.

Some cloud infrastructure visualization technologies (e.g., visualization technologies) may generate the visualization to be representative of the entire source data. In addition, some visualization technologies may display the visualization including information describing each of the objects and each of the connections described in the source data. Some visualization technologies may generate and only display the visualization according to a pre-determined view (e.g., a view selected by a designer of the visualization technology). The pre-determined view of the visualization may not be alterable by a user via the GUI.

The visualization when representative of the entire source data may be complex and difficult for the user to readily decipher and understand. In addition, the user may not readily be able to select the particular cloud infrastructure or particular cloud service from the visualization due to the large number of objects (e.g., components), connections, and information included in the visualization representative of the entire source data. For example, it may not be readily discernable within the visualization representative of the entire source data what components are included in the visualization, what the different relationships between the components are in the visualization, and what costs are associated with a use of the components in the visualization. Likewise, due to the large number of objects, connections, and/or information included in the visualization representative of the entire source data, the user may struggle to locate particular components or information related to those particular components.

According to one or more embodiments described in the present disclosure, the visualization may be alterable based on user input received via the GUI. In some embodiments, a default view of the visualization may initially be displayed via the GUI. In these and other embodiments, the default view of the visualization may include a top-level structure view representative of the cloud infrastructure.

User input may be received via the GUI effective to indicate that a portion of the objects, connections, and/or information within the visualization are to be filtered out of (e.g., hidden from) the visualization. For example, the user input received may be effective to indicate that each component within a particular region displayed within the visualization are to be removed. In some embodiments, the display of the visualization may be alterable to only include data of interest to the user. Additional user input may be received via the GUI effective to indicate that a perspective (e.g., a view of a particular path connecting the various components using particular connections) of the visualization is to be altered. Accordingly, the visualization of the source data may be displayed and alterable based on user input received via the GUI.

According to at least one embodiment described in the present disclosure, the visualization may be altered based on user input to be more readily human readable. In addition, the visualization displayed according to at least one embodiment described in the present disclosure may be alterable based on user input to only display particular perspectives of interest to the user.

Therefore, according to one or more embodiments described in the present disclosure, the visualization may be generated and displayed via the GUI in a way that the user may readily locate and discern information of interest to the user.

These and other embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

FIG. 1 is a block diagram of an example environment 100 to alter a visualization 126 of source data from data sources 102, 104, 106, arranged in accordance with at least one embodiment described in the present disclosure. The environment 100 may include one or more data sources 102, 104, 106 and a computing device 108. The operating environment 100 may also include a display screen 112 and a network 128.

The network 128 may include any communication network configured for communication of signals between any of the components (e.g., 102, 104, 106, and 108) of the operating environment 100. The network 128 may be wired or wireless. The network 128 may have numerous configurations including a star configuration, a token ring configuration, or another suitable configuration. Furthermore, the network 128 may include a local area network (LAN), a wide area network (WAN) (e.g., the Internet), and/or other interconnected data paths across which multiple devices may communicate. In some embodiments, the network 128 may include a peer-to-peer network. The network 128 may also be coupled to or include portions of a telecommunications network that may enable communication of data in a variety of different communication protocols.

In some embodiments, the network 128 includes or is configured to include a BLUETOOTH® communication network, a Z-Wave® communication network, an Insteon® communication network, an EnOcean® communication network, a Wi-Fi communication network, a ZigBee communication network, a HomePlug communication network, a Power-line Communication (PLC) communication network, a message queue telemetry transport (MQTT) communication network, a MQTT-sensor (MQTT-S) communication network, a constrained application protocol (CoAP) communication network, a representative state transfer application protocol interface (REST API) communication network, an extensible messaging and presence protocol (XMPP) communication network, a cellular communication network, any similar communication networks, or any combination thereof for sending and receiving data. The data communicated in the network 128 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with the computing device 108 and the data sources 102, 104, 106.

Each of the data sources 102, 104, 106 may include one or more collections of source data. The source data may include data collections of a corresponding entity, such as a cloud infrastructure provider for cloud computing such as Microsoft Azure, AWS, Google Cloud, and/or any other cloud infrastructure provider. In some embodiments, the data sources 102, 104, 106 may be owned by or otherwise associated with one entity. In other embodiments, the data sources 102, 104, 106 may be owned by or otherwise associated with multiple entities. In some embodiments, the entities corresponding to the data sources 104, 106 may provide an application programming interface 116, 118 that permits the computing device 108 to obtain the source data from the data sources 104, 106 via the network 128. In addition, in some embodiments, the source data may be obtained from the user. In these and other embodiments, the source data may include data collections representative of a cloud infrastructure that the user selected using a cloud infrastructure selection tool. In these and other embodiments, the data sources 102, 104, 106 may be owned by or otherwise associated with the user.

The computing device 108 may include a visualization module 113. The visualization module 113 may be configured to implement steps and processes associated with generating and altering the visualization 126.

Figure 2:
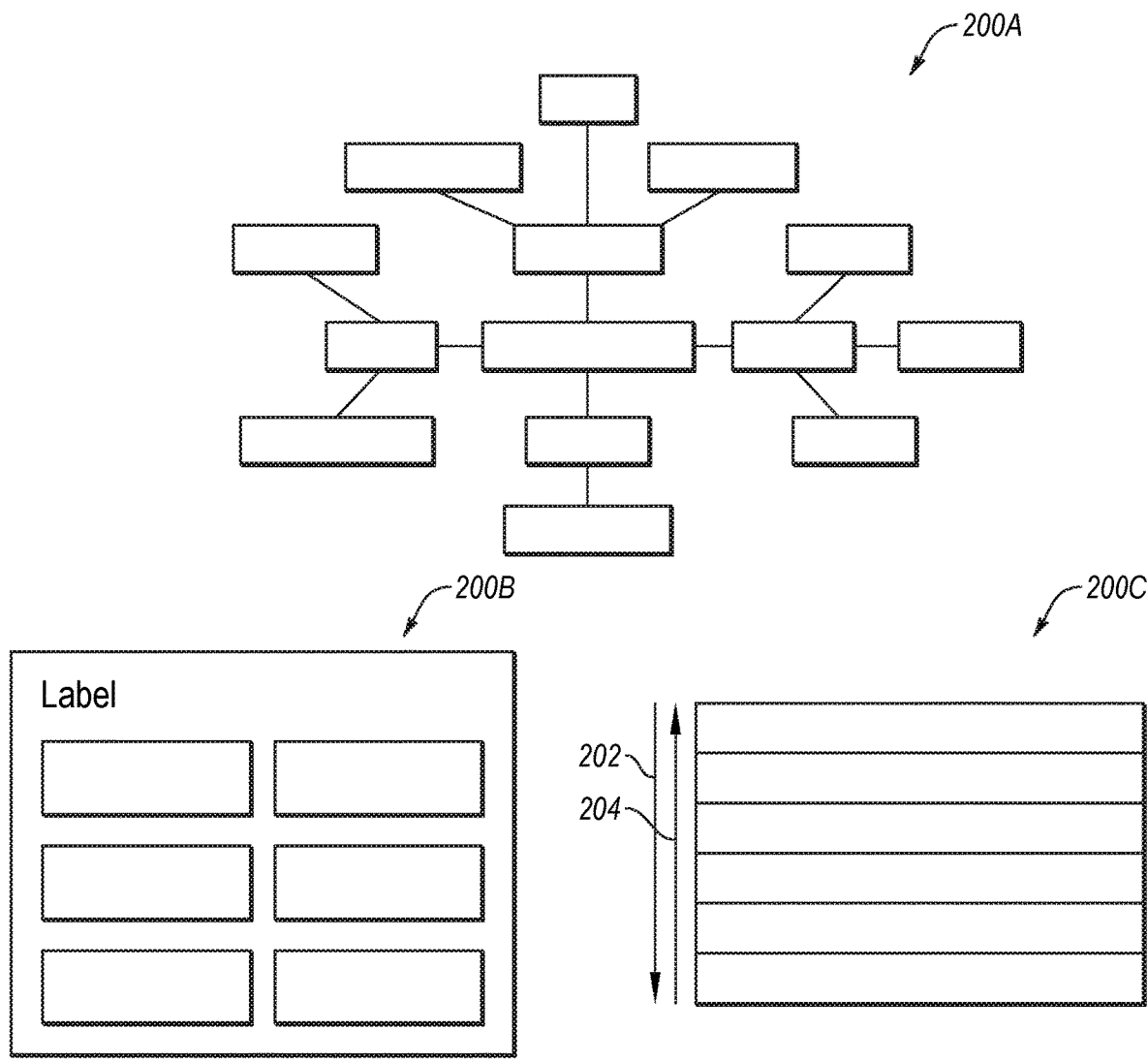
FIG. 2 illustrates various example visualizations with various example visualization types.

FIG. 2 illustrates various example visualizations 200A, 200B, 200C (hereinafter collectively "visualizations 200") with various example visualization types, arranged in accordance with at least some embodiments described in the present disclosure. The visualization 200A has a mind map visualization type that organizes information in a hierarchical manner to show relationships among pieces of a whole. The visualization 200B has a container visualization type in which different objects that have a same feature are depicted within a same group or container. The visualization 200C has an abstraction layers visualization type that may, e.g., generalize conceptual models or algorithms with increasing order of complexity in one direction and increasing order of abstraction in the other direction, as indicated by the arrows 202, 204.

Returning to FIG. 1, in some embodiments, the computing device 108 may obtain the source data from one or more of the data sources 102, 104, 106. The source data may include information describing an associated cloud infrastructure. The source data may include information describing hardware components and software components that makeup the cloud infrastructure.

In some embodiments, the source data may include multiple layers of information. Each of the layers of information may describe different aspects of the cloud infrastructure. For example, some of the layers of information may describe components within different regions of the cloud infrastructure. As another example, some of the layers of information may describe components within different VPCs. As yet another example, some of the layers of information may include information describing different relationships between various components. As another example, the layers of information may describe a hierarchical relationship of the components within the cloud infrastructure.

In some embodiments, the source data may include multiple portions. Each portion may be representative of a different component, region, area, or any other appropriate grouping of components and information in the source data. Additionally or alternatively, the source data may include information indicating relationships (e.g., containment information) between the various components and/or portions of information. Further, in some embodiments, the source data may include multiple perspectives of the cloud infrastructure. In these and other embodiments, each perspective may include a path of traversing the cloud infrastructure via associations between the components or the portions of the source data. The source data may also include information describing security groups (e.g., firewall rules) of the various components. In addition, in some embodiments, the computing device 108 may obtain sample data regarding performance of the components within the cloud infrastructure.

The visualization module 113 may include code and routines configured to enable a computing device to perform one or more operations with respect to generating and presenting the visualization 126. Additionally or alternatively, the visualization module 113 may be implemented using hardware including a processor, a microprocessor (e.g., to perform or control performance of one or more operations), a field-programmable gate array (FPGA), or an application-specific integrated circuit (ASIC). In some other instances, the visualization module 113 may be implemented using a combination of hardware and software. In the present disclosure, operations described as being performed by the visualization module 113 may include operations that the visualization module 113 may direct a corresponding system to perform.

The visualization module 113 may obtain the source data. In addition, the visualization module 113 may generate the visualization 126. In addition, the visualization module 113 may direct display of the visualization 126 via the display screen 112. The visualization 126 may initially be displayed via the GUI according to the default view. In some embodiments, the default view of the visualization 126 may include a top-level structure view representative of the entire cloud infrastructure. In other embodiments, the default view of the visualization 126 may include a top-level structure view representative of one or more portions of the source data. In some embodiments, the default view of the visualization 126 may be referred to as a top-level structure view and/or an overview of the cloud infrastructure.

Objects, connections, and/or information included in the visualization 126 may be representative of the cloud infrastructure described in the source data. Each object may be representative of a component described in the source data. Further, each connection may be representative of a relationship between two or more components described in the source data. In some embodiments, one object in the visualization 126 may represent multiple components described in the source data.

The visualization 126 may be alterable by the visualization module 113 based on user input received via the GUI. User input (e.g., a first user input) may be received via the GUI effective to indicate that objects and/or information representative of a portion of information in the source data are to be filtered out (e.g., hidden). For example, the user input may be effective to select information describing a physical location of one or more of the components within the cloud infrastructure is to be filtered out of the visualization 126 by the visualization module 113. As another example, the user input may be effective to select information that does not correspond to central processing units (CPU) is to be hidden in the visualization 126 by the visualization module 113 so as to indicate CPU power of the particular cloud infrastructure. In some embodiments, the visualization module 113 may determine which objects, connections, and information are to be hidden or included in the visualization 126 based on the user input.

In some embodiments, the visualization module may determine which objects, connections, and/or information representative of portions of the source data are to be included in the visualization 126 based on the user input. the objects, connections, and/or information representative of the one or more portions of the source data to be included in the visualization 126 may also be determined based on the relationships between all of the portions of the source data.

In some embodiments, an additional user input (e.g., a second user input) may be received via the GUI effective to select objects, connections, and/or information representative of subsets of the layers of information (e.g., layers of abstraction) in the source data (e.g., one or more perspectives of the cloud infrastructure) that are to be included in the visualization 126 by the visualization module 113. For example, the user input may be effective to select objects, connections, and/or information representative of middle layers of the source data are to be included in the visualization 126 by the visualization module 113. In some embodiments, the additional user input may be effective to select objects and/or information representative of only a portion of the subsets of the layers of information that are to be included in the visualization 126 displayed via the GUI.

In some embodiments, the visualization module 113 may alter the view of the visualization 126 displayed via the GUI based on the user input (e.g., the first user input) according to the additional user input (e.g., the second user input) and/or based on the relationships between the components. For example, the visualization module 113 may identify one or more objects, connections, and/or information representative of different portions of the source data that were indicated as to be hidden in the visualization 126 by the user input. The visualization module 113 may hide the corresponding objects, connections, and/or information in the visualization 126 displayed via the GUI. As another example, the visualization module 113 may identify portions of the source data that correspond to the objects, connections, and/or information that was indicated to be included in the visualization 126. The visualization module 113 may add the corresponding objects, connections, and/or information to the visualization 126 displayed via the GUI. As yet another example, the visualization module 113 may identify subsets of the layers of information in the source data that were indicated as to be included in the visualization 126. The visualization module 113 may add the corresponding objects, connections, and/or information to the visualization 126 displayed via the GUI.

In some embodiments, the user input and the additional user input may be combined into a single action made by the user via the GUI. In other embodiments, the user input and the additional user input may each include separate actions made by the user via the GUI. Alternatively, the user input, the additional user input, or both the user input and the additional user input may include multiple actions made by the user via the GUI. For example, the user input may include a single action made by the user via the GUI and the second user input may include multiple separate actions made by the user via the GUI. As another example, the first user input may include multiple separate actions made by the user via the GUI and the second user input may include a single action made by the user via the GUI. As yet another example, the first user input may include multiple separate actions made by the user via the GUI and the additional user input may also include multiple separate actions made by the user via the GUI.

In some embodiments, the additional user input may be received prior to the user input. In other embodiments, the user input may be received prior to the additional user input. Alternatively, the user input and the additional user input may be alternatingly received.

In addition, in some embodiments, the additional user input may indicate a particular object representative of a first portion of the source data is to be a start point and another object representative of a second portion of the source data is to be an end point for displaying associations of the portions of the source data in the visualization 126. The visualization module 113 may identify the first portion of the source data and the second portion of the source data. The visualization module 113 may add the corresponding objects to the visualization 126 displayed via the GUI as the start point and the end point. For example, the object representative of the first portion may be added to the visualization 126 as the start point of the visualization 126 and the object representative of the second portion may be added to the visualization 126 as the end point of the visualization 126.

In some embodiments, the additional user input may indicate one or more particular types of relationships between the components (e.g., types of connections between the objects) that are to be included in the visualization 126. The visualization module 113 may identify portions of the source data that correspond to the particular types of relationships between the components. The visualization module 113 may include the connections that correspond to the portions of the source data that correspond to the particular types of relationships and may hide the connections that do not correspond to the portions of the source data that correspond to the particular types of relationships within the visualization 126 in the GUI.

In some embodiments, the visualization 126 may include multiple different views. In these and other embodiments, the visualization module 113 may direct display of a single view of the visualization 126 at a time. Further user input may be received effective to select the different views of the visualization 126. Additionally, each of the different views of the visualization 126 may include different perspectives of the cloud infrastructure. The visualization module 113 may change the visualization 126 in the GUI based on further user input.

In some embodiments, the further user input may be received via the GUI effective to select objects, connections, and/or information representative of additional subsets of the layers of information in the source data that are to be included in the visualization 126. The visualization module 113 may identify the selected subsets of the layers of information in the source data and corresponding objects, connections, and/or information that are also to be included in the visualization 126. The visualization module 113 may add the corresponding objects, connections, and/or information (e.g., further alter) to the visualization 126 in addition to the objects, connections, and/or information representative of the subsets of layers of information that are already included in the visualization 126.

In some embodiments, further user input may be received via the GUI effective to select objects, connections, and/or information representative of additional subsets of layers of information in the source data to be hidden in the visualization 126. The visualization module 113 may identify the selected objects, connections, and/or information and the corresponding subsets of the layers of information in the source data that are also to be hidden in the visualization 126. The visualization module 113 may hide the selected objects, connections, and/or information representative of the additional subsets of information in the source data in addition to the objects, connections, and/or information representative of the subsets of information in the source data that are already hidden in the visualization 126.

In some embodiments, the visualization module 113 may associate objects, connections, and/or information representative of portions of the source data in different layers based on different layers of information that are hidden in the visualization 126. For example, the user input may be effective to indicate that objects, connections, and/or information representative of middle layers of the source data in the visualization 126 are to be hidden in the visualization 126. Despite the corresponding objects, connections, and/or information being hidden, the middle layers of the source data may indicate relationships between the objects, connections, and/or information representative of the layers that are included in the visualization 126. The visualization module 113 may identify these relationships and indicate these relationships via connections between two or more objects that are included in the visualization 126.

In some embodiments, the visualization module 113 may perform functions based on the further user input. The visualization module 113 may perform the functions and may direct display of the results via the GUI. For example, the further user input may be effective to request a summation of CPU power of the components that correspond to the objects that are included in the visualization 126. The visualization module 113 may sum up and display information representative of CPU power of each component represented by an object in the visualization 126.

In some embodiments, the user may provide more user input via the GUI effective to select a particular cloud infrastructure for cloud computing activities associated with the user. In other embodiments, the user may select a particular service of the cloud infrastructure, and pre-determined components of the cloud infrastructure may be used for the cloud computing activities associated with the user. The pre-determined components may be associated with the particular service selected by the user. The altered view of the visualization 126 displayed via the GUI may permit the user to more readily discern the particular cloud infrastructure that the user selects.

In some embodiments, the user may provide additional user input via the GUI effective to request a sampling of the particular cloud infrastructure to be performed. The visualization module 113 may direct the cloud infrastructure to be sampled using the sample data obtained from the data sources 102, 104, 106. The sampling may determine performance, costs, or any other appropriate factor of implementing the particular cloud infrastructure.

Figure 3:
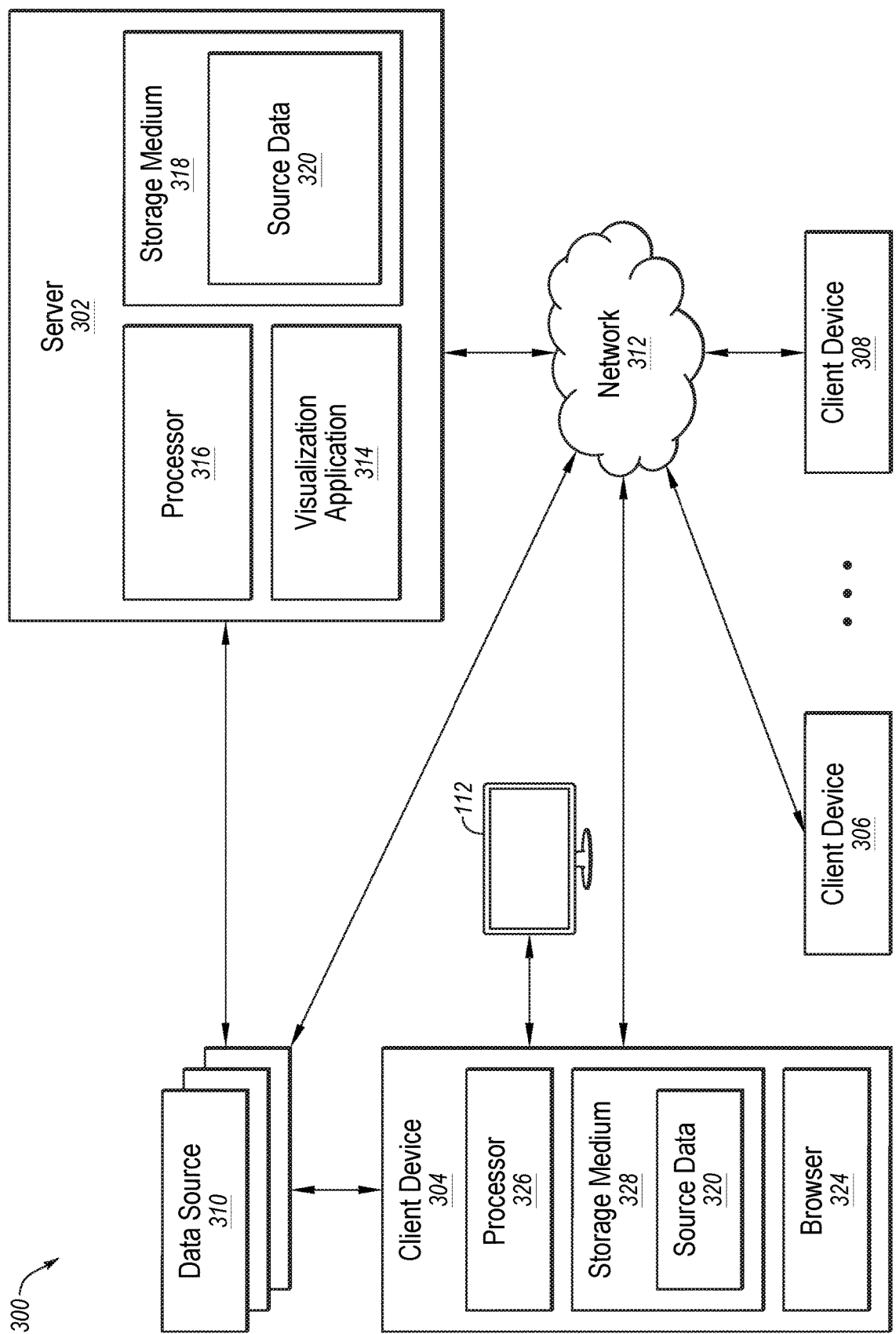
FIG. 3 is a block diagram of an example operating environment in which the computing device of FIG. 1 may be implemented.

FIG. 3 is a block diagram of an example operating environment in which the computing device 108 of FIG. 1 may be implemented, arranged in accordance with at least one embodiment described in the present disclosure. The operating environment 300 may include a server 302 and one or more client devices 304, 306, 308. The server 302 and/or the client devices 304, 306, 308 may be configured to generate, alter, and/or interact with visualizations of source data from one or more data sources 310. Each of the one or more data sources 310 may include or correspond to the data sources described elsewhere in the present disclosure. Each of the client devices 304, 306, 308 may include or correspond to the computing device 108 of FIG. 1.

Although one server 302 and three client devices 304, 306, 308 are illustrated in FIG. 3, the operating environment 300 may more generally include one or more servers 302 and one or more client devices 304, 306, 308. In these and other embodiments, the operating environment 300 may include other servers and/or devices not illustrated in FIG. 3.

The operating environment 300 may additionally include a network 312. The network 312 may correspond to the network 128 of FIG. 1. In general, the network 312 may include one or more wide area networks (WANs) and/or local area networks (LANs) that enable the server 302, the client devices 304, 306, 308, and the data sources 310 to communicate with each other. In some embodiments, the network 312 may include the Internet, including a global internetwork formed by logical and physical connections between multiple WANs and/or LANs. Alternately or additionally, the network 312 may include one or more cellular radio frequency (RF) networks and/or one or more wired and/or wireless networks such as 802.xx networks, Bluetooth access points, wireless access points, Internet Protocol (IP)-based networks, or other wired and/or wireless networks. The network 312 may also include servers that enable one type of network to interface with another type of network.

In at least one embodiment, the server 302 may host a web-based visualization application ("application 314") that allows the client devices 304, 306, 308 and/or users thereof to generate, alter, and/or interact with the visualization of source data as described in the present disclosure. The application 314 may correspond to the visualization module 113 of FIG. 1. In other embodiments, the application 314 may include a non-web-based application but may generally be described in the present disclosure as a web-based application for simplicity.

The server 302 may additionally include a processor 316 and a storage medium 318. The processor 316 may be of any type such as a CPU, a microprocessor (µP), a microcontroller (µC), a digital signal processor (DSP), or any combination thereof. The processor 316 may be configured to execute computer instructions that, when executed, cause the processor 316 to perform or control performance of one or more of the operations described in the present disclosure with respect to the server 302.

The storage medium 318 may include volatile memory such as random access memory (RAM), persistent or non-volatile storage such as read only memory (ROM), electrically erasable and programmable ROM (EEPROM), compact disc-ROM (CD-ROM) or other optical disk storage, magnetic disk storage or other magnetic storage device, NAND flash memory or other solid state storage device, or other persistent or non-volatile computer storage medium. The storage medium 318 may store computer instructions that may be executed by the processor 316 to perform or control performance of one or more of the operations described in the present disclosure with respect to the server 302.

The storage medium 318 may additionally store source data 320. The source data 320 may obtained from the data sources 310. In at least one embodiment, a single portion of the source data 320 may be generated for each of the data sources 310. In at least one embodiment, the entire source data 320 may be generated for a single data source 310. The source data 320 may be persistently stored in the storage medium 318 and/or at least temporarily stored in volatile storage, e.g., in-memory.

Each of the client devices 304, 306, 308 may execute an application, such as the browser 324, configured to communicate through the network 312 with the server 302. Each of the other client devices 306, 308 may be similarly configured to execute a browser, such as the browser 324. The browser 324 may include an Internet browser or other suitable application for communicating through the network 312 with the server 302. The browser 324 may generate, download, and/or interact with the visualization. Each of the client devices 304, 306, 308 may include a desktop computer, a laptop computer, a tablet computer, a mobile phone, a smartphone, a personal digital assistant (PDA), a wearable device (e.g., a smart watch), or another suitable client device.

Each of the client devices 304, 306, 308 may additionally include a processor and a storage medium, such as a processor 326 and a storage medium 328 as illustrated for the client device 304 in FIG. 3. Each of the other client devices 306, 308 may be similarly configured. Similar to the processor 316 of the server 302, the processor 326 may be of any type such as a CPU, a µP, a µC, a DSP, or any combination thereof. The processor 326 may be configured to execute computer instructions that, when executed, cause the processor 326 to perform or control performance of one or more of the operations described in the present disclosure with respect to the client device 304 and/or the browser 324.

Similar to the storage medium 318 of the server 302, the storage medium 328 of the client device 304 may include volatile memory such as RAM, persistent or non-volatile storage such as ROM, EEPROM, CD-ROM or other optical disk storage, magnetic disk storage or other magnetic storage device, NAND flash memory or other solid state storage device, or other persistent or non-volatile computer storage medium. The storage medium 328 may store computer instructions that may be executed by the processor 326 to perform one or more of the operations described in the present disclosure with respect to the client device 304 and/or the browser 324. The storage medium 328 may additionally store, at least temporarily, the source data 320 from the server 302 and/or created locally on the client device 304.

Embodiments described in the present disclosure are not limited to using a browser to communicate with the server 302 to generate, customize, and/or interact with the visualization. For example, rather than or in addition to a browser, the client devices 304, 306, 308 may include a native app as are often used on client devices 304, 306, 308 such as mobile devices including smartphones and tablet computers. Accordingly, embodiments described in the present disclosure generally include generating, customizing, and/or interacting with the visualization using a browser, a native app, or another suitable application on the client devices 304, 306, 308.

Figure 4:
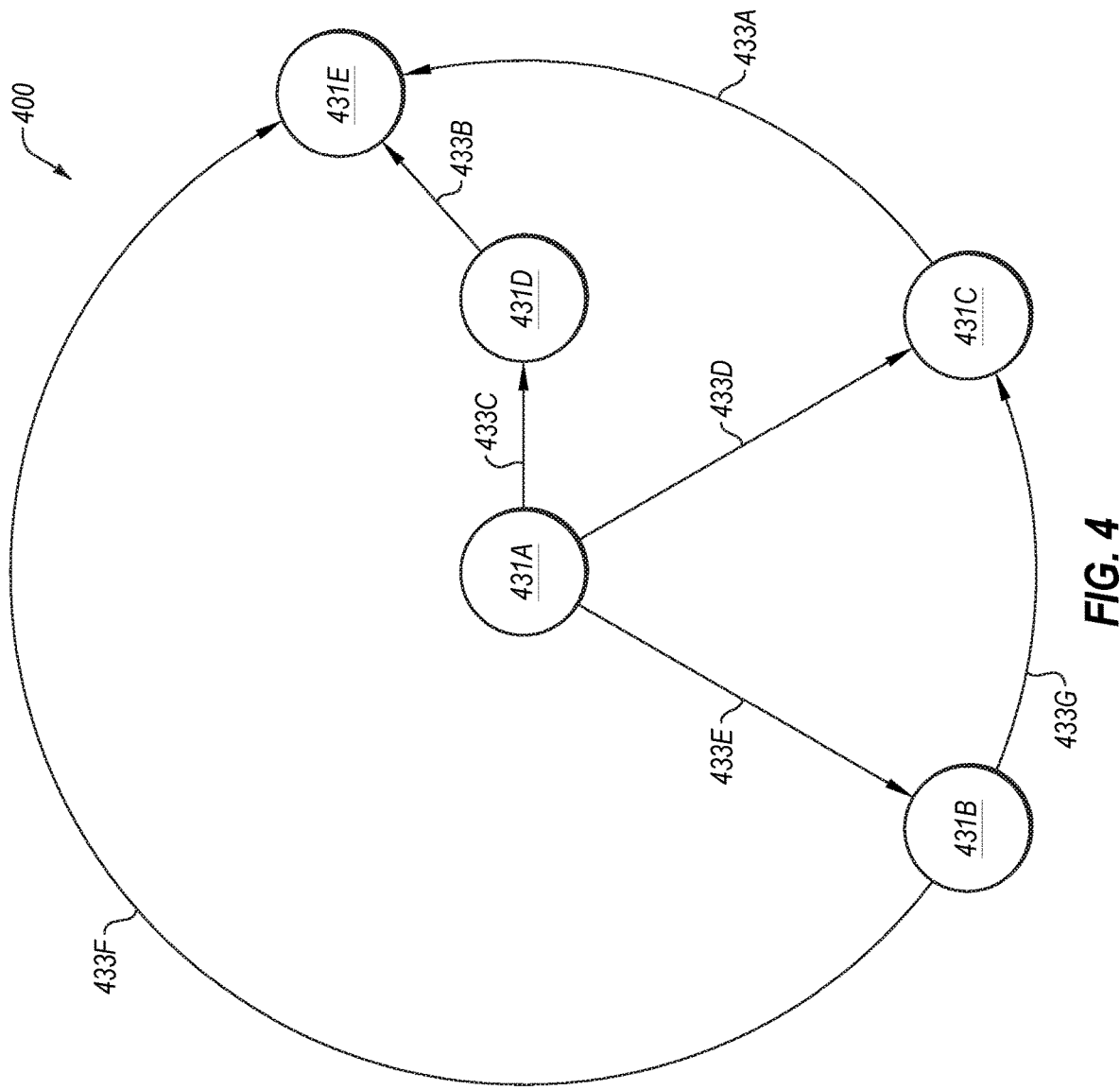
FIG. 4 illustrates an example visualization of source data describing an example cloud infrastructure.

FIG. 4 illustrates an example visualization 400 of source data describing a cloud infrastructure, arranged in accordance with at least one embodiment described in the present disclosure. The visualization 400 may correspond to the visualization 126 of FIG. 1. The visualization 400 may include multiple objects 431a-e and multiple connections 433a-g.

Each of the objects 431a-e may represent one or more components of the cloud infrastructure. For example, each of the objects 431a-e may represent a VPC of the cloud infrastructure. Each of the connections 433a-g may represent relationships between the objects 431a-e. The objects 431a-e and the connections 433a-g may form a web because the source data does not describe the cloud infrastructure as a single stack of components and relationships.

The user input discussed above in relation to FIG. 1 may be effective to indicate how the visualization 400 is to be altered. For example, the user input may be effective to indicate that object 431b is to be the start point and object 431e is to be the end point of the visualization 400. Based on this user input and relationships indicated by connection 433f and connection 433g including the arrow pointing away from object 431e, the visualization module 113 of FIG. 1 may alter the visualization 400 to hide objects 431a, 431d since these objects 431a, 431d are before object 431b in the visualization 400.

Figure 5:
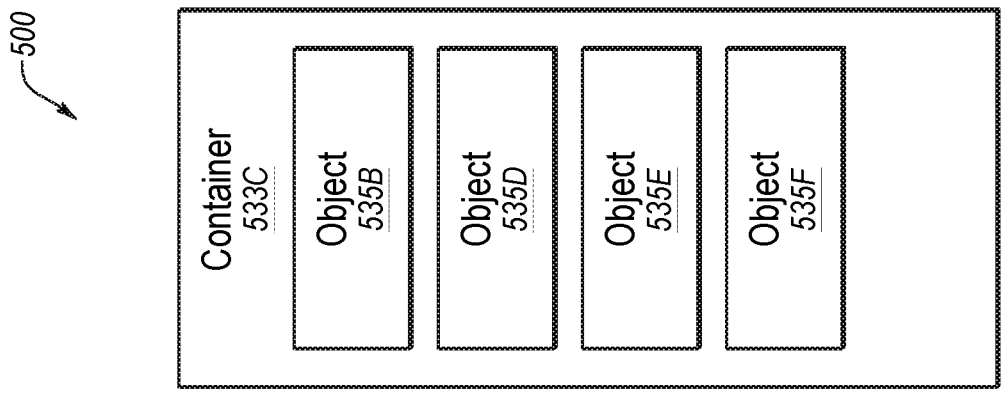
FIG. 5 illustrates another example visualization of source data describing an example cloud infrastructure.
Figure 5:
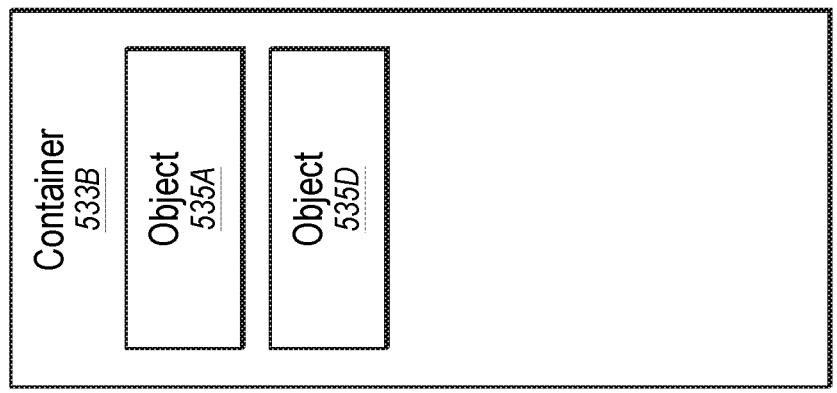
Figure 5:
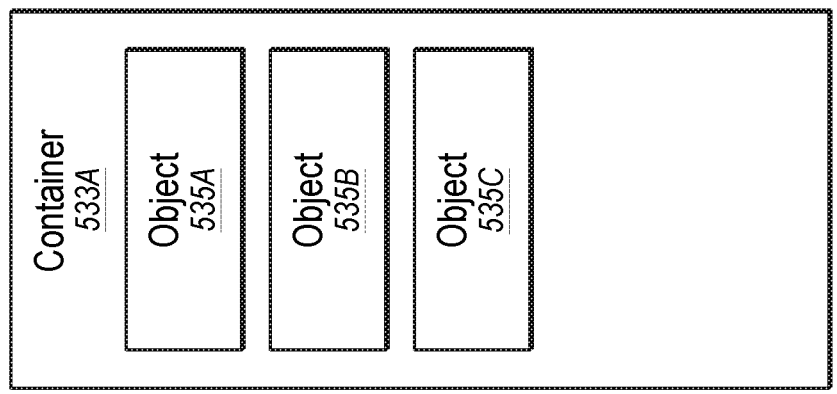

FIG. 5 illustrates another example visualization 500 of source data describing a cloud infrastructure, arranged in accordance with at least one embodiment described in the present disclosure. The visualization 500 may correspond to the visualization 126 of FIG. 1. The visualization 500 may include multiple containers 533a-c (collectively referred to in the present disclosure as "containers 533"). Each of the containers 533 may include one or more objects 535a-f (collectively referred to in the present disclosure as "objects 535").

In some embodiments, the containers 533 may represent grouping of components of the cloud infrastructure. In these and other embodiments, the containers 533a-c may represent regions, VPCs, security rules, or any other appropriate relationship between the objects 535. In other embodiments, the containers 533 may represent components and each of the objects 535 within the containers 533 may represent sub-components. For example, the containers 533 may represent VPCs and each of the objects 535 within the containers 533 may represent availability zones within the different VPCs. As another example, the containers 533 may represent regions and the objects 535 may represent servers available within the regions.

In some embodiments, the containers 533 may include duplicate objects 535. For example, container 533b and container 533c may both include object 535d representative of the same component in the cloud infrastructure. As another example, container 533a and container 533c may both include object 535a representative of the same component in the cloud infrastructure.

Figure 6:
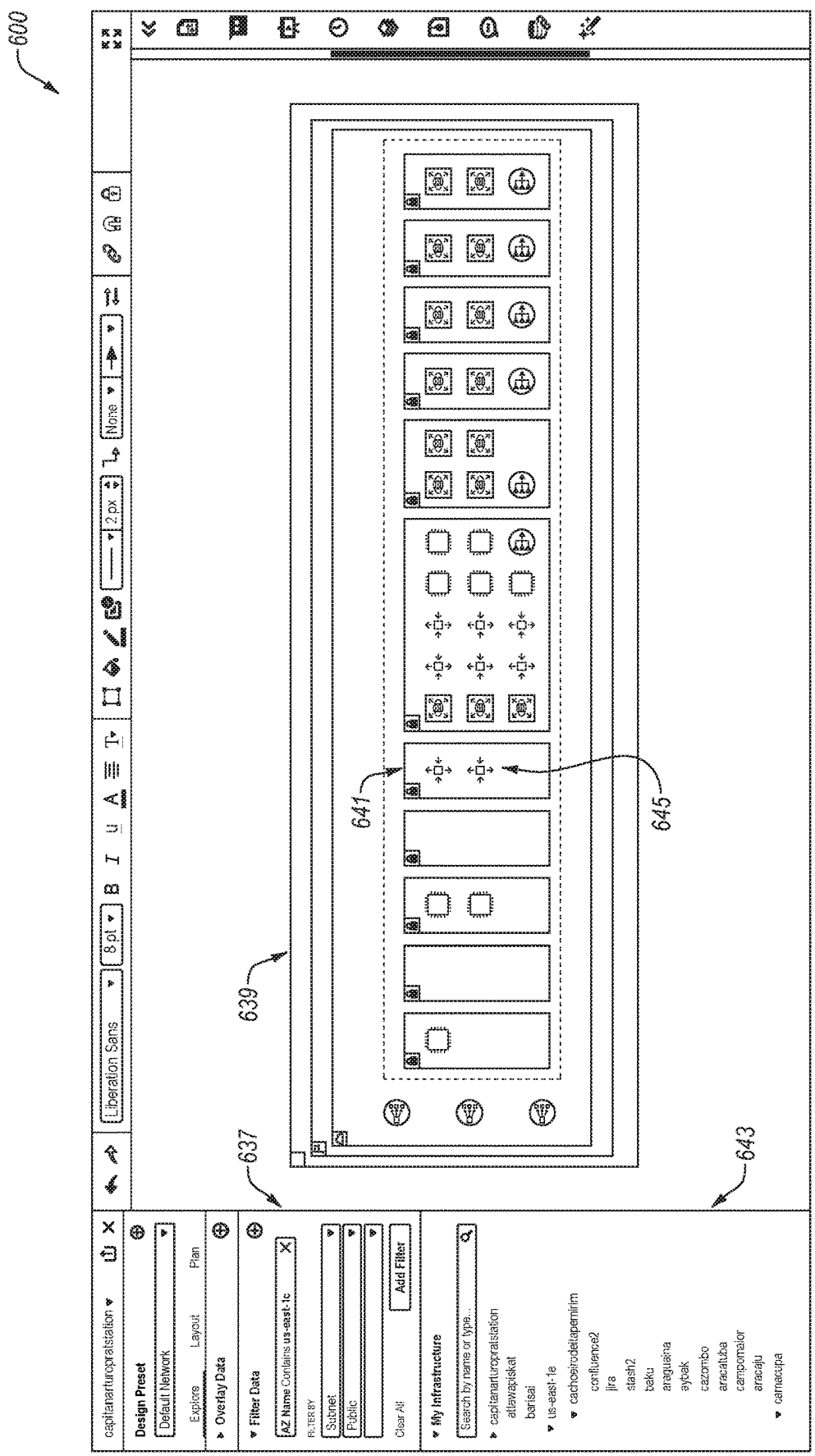
FIG. 6 illustrates a screen shot of a graphical user interface (GUI) that includes selection fields and a visualization that may be implemented in the computing device of FIG. 1.

FIG. 6 illustrates a screen shot 600 of a GUI that includes selection fields 637, 643 and a visualization 639 that may be implemented in the computing device 108 of FIG. 1. The visualization 639 may correspond to the visualization 126 of FIG. 1. As illustrated in FIG. 6, the selection field 637 includes multiple drop-down boxes and an "Add Filter" button. The drop-down boxes may be configured to pre-populate with filter types to be selected by the user to filter out objects, connections, and/or information included in the visualization 639. The "Add Filter" button may be configured to be selected by the user to apply the selected filter types. As illustrated in FIG. 6, the selection field 643 includes multiple selection fields to be selected by the user to select various cloud infrastructures. The visualization 639 may include multiple containers 641 that may include one or more objects 645. In FIG. 6, a single container is denoted as 641 to illustrate an example container. In addition, in FIG. 6, a single object is denoted as 645 to illustrate an example object.

Figure 7:
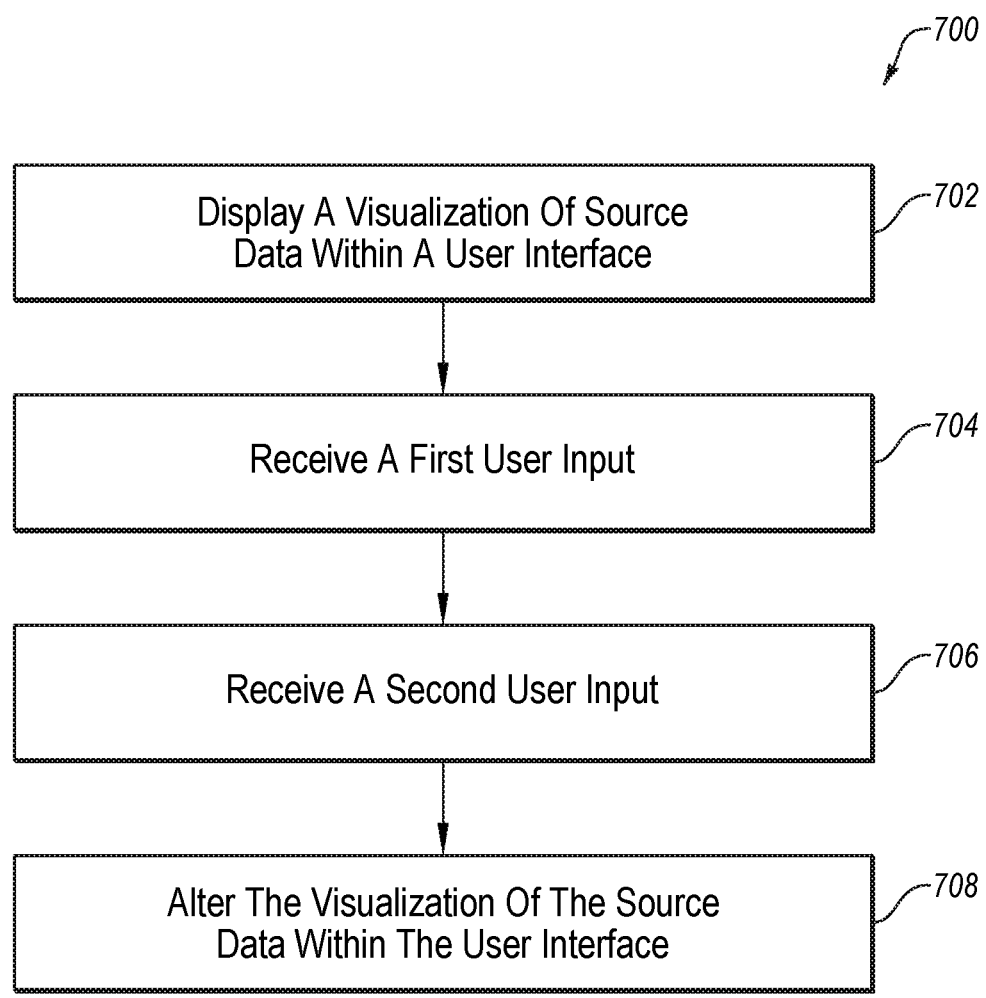
FIG. 7 illustrates a flowchart of a method to alter a visualization of source data.

FIG. 7 illustrates a flowchart of a method to alter a visualization of source data, arranged in accordance with at least one embodiment described in the present disclosure. The method 700 may be programmably performed or controlled by a processor in, e.g., a computer and/or server that executes a browser, visualization application, and/or other application to generate the visualization. In an example implementation, the method 700 may be performed in whole or in part by the server 302 and/or the client device 304 of FIG. 3. The method 700 may include one or more of blocks 702, 704, 706, and/or 708. The method 700 may begin at block 702.

At block 702 ("Display A Visualization Of Source Data Within A User Interface"), a visualization of source data may be displayed within a user interface. The user interface (e.g., the GUI) may be displayed via a display screen. The source data may include multiple layers, subsets of layers and/or portions of information that describe a cloud infrastructure. For example, the visualization 126 may be displayed via the user interface on the display screen 112 of FIG. 1. Block 702 may be followed by block 704.

At block 704 ("Receive A First User Input"), a first user input may be received. The first user input may be received via the user interface. In some embodiments, the first user input may be effective to select portions of the source data to be included in the visualization of the data displayed within the user interface. For example, the first user input may be effective to indicate that objects, connections, and/or information are to be filtered from the visualization 126 of FIG. 1. Block 704 may be followed by block 706.

At block 706 ("Receive A Second User Input"), a second user input may be received. The second user input may be received via the user interface. In some embodiments, the second user input may be effective to select one or more subsets of the layers of information to be included in the visualization displayed within the user interface. For example, the second user input may be effective to indicate that one or more subsets of the layers of the information that are to be included in the visualization 126 of FIG. 1. Block 706 may be followed by block 708.

At block 708 ("Alter The Visualization Of The Source Data Within The User Interface"), the visualization of the source data may be altered within the user interface. The visualization of the source data may be altered based on the first user input and according to the second user input. The altering may include hiding one or more portions of the source data and one or more subsets of layers of information in the source data that are not to be included in the visualization displayed within the user interface. For example, the visualization module 113 of FIG. 1 may hide objects, connections, and/or information included in the visualization 126 that are representative of the subsets of layers of information in the source data that are not to be included in the visualization 126 of FIG. 1. As another example, the visualization module 113 of FIG. 1 may include objects, connections, and/or information in the visualization 126 that are representative of the portions of the source data that are to be included in the visualization 126 of FIG. 1.

One skilled in the art will appreciate that, for this and other processes and methods disclosed in the present disclosure, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 8:
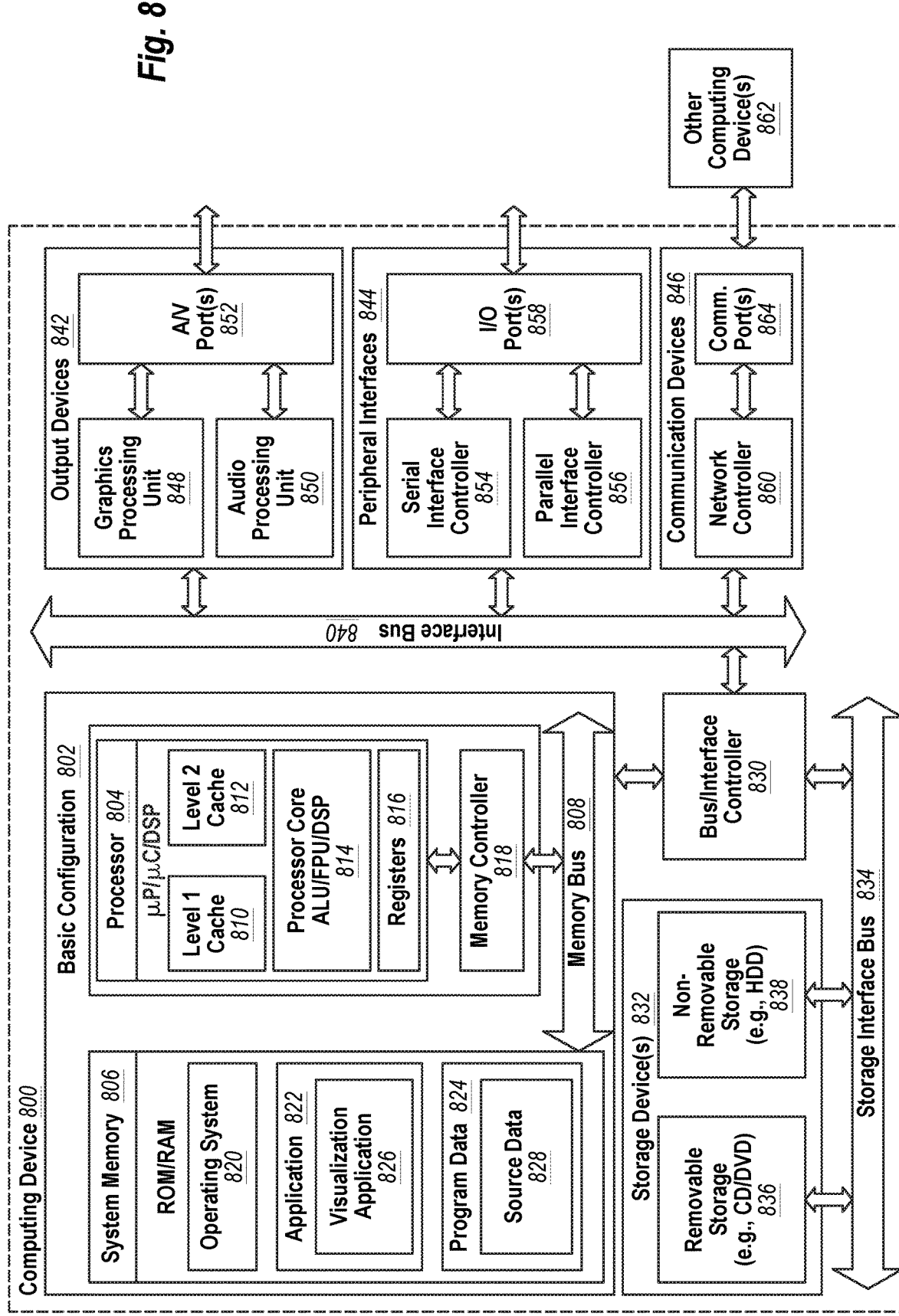
FIG. 8 is a block diagram illustrating an example computing device that is arranged for altering visualizations of source data, all arranged in accordance with at least one embodiment described in the present disclosure.

FIG. 8 is a block diagram illustrating an example computing device that is arranged for altering visualizations of source data, arranged in accordance with at least one embodiment described in the present disclosure. In a basic configuration 802, the computing device 800 typically includes one or more processors 804 and a system memory 806. A memory bus 808 may be used to communicate between the processor 804 and the system memory 806.

Depending on the desired configuration, the processor 804 may be of any type including, but not limited to, a microprocessor (μP), a microcontroller (μC), a digital signal processor (DSP), or any combination thereof. The processor 804 may include one or more levels of caching, such as a level one cache 810 and a level two cache 812, a processor core 814, and registers 816. The processor core 814 may include an arithmetic logic unit (ALU), a floating-point unit (FPU), a digital signal processing core (DSP Core), or any combination thereof. An example memory controller 818 may also be used with the processor 804, or in some implementations the memory controller 818 may include an internal part of the processor 804.

Depending on the desired configuration, the system memory 806 may be of any type including volatile memory (such as RAM), nonvolatile memory (such as ROM, flash memory, etc.), or any combination thereof. The system memory 806 may include an operating system 820, one or more applications 822, and program data 824. The application 822 may include a visualization application 826 that is arranged to generate, customize, and/or interact with visualizations, as described in the present disclosure. The program data 824 may include source data 828 (which may include or correspond to the source data discussed elsewhere in the preset disclosure) as is described in the present disclosure, or other visualization application data. In some embodiments, the application 822 may be arranged to operate with the program data 824 on the operating system 820 such that the method 700 of FIG. 7 may be provided as described in the present disclosure.

The computing device 800 may have additional features or functionality, and additional interfaces to facilitate communications between the basic configuration 802 and any involved devices and interfaces. For example, a bus/interface controller 830 may be used to facilitate communications between the basic configuration 802 and one or more data storage devices 832 via a storage interface bus 834. The data storage devices 832 may be removable storage devices 836, non-removable storage devices 838, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 806, the removable storage devices 836, and the non-removable storage devices 838 are examples of computer storage media or non-transitory computer-readable media. Computer storage media or non-transitory computer-readable media includes RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other non-transitory medium which may be used to store the desired information and which may be accessed by the computing device 800. Any such computer storage media or non-transitory computer-readable media may be part of the computing device 800.

The computing device 800 may also include an interface bus 840 to facilitate communication from various interface devices (e.g., output devices 842, peripheral interfaces 844, and communication devices 846) to the basic configuration 802 via the bus/interface controller 830. The output devices 842 include a graphics processing unit 848 and an audio processing unit 850, which may be configured to communicate to various external devices such as a display or speakers via one or more A/V ports 852. Visualizations generated by the visualization application 826 may be output through the graphics processing unit 848 to such a display. The peripheral interfaces 844 include a serial interface controller 854 or a parallel interface controller 856, which may be configured to communicate with external devices such as input devices (e.g., keyboard, mouse, pen, voice input device, touch input device, etc.), sensors, or other peripheral devices (e.g., printer, scanner, etc.) via one or more I/O ports 858. Such input devices may be operated by a user to provide input to the visualization application 826, which input may be effective to, e.g., alter the visualizations generated by the visualization application 826. The communication devices 846 includes a network controller 860, which may be arranged to facilitate communications with one or more other computing devices 862 over a network communication link via one or more communication ports 864.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used in the present disclosure may include both storage media and communication media.

The computing device 800 may be implemented as a portion of a small-form factor portable (or mobile) electronic device such as a smartphone, a personal data assistant (PDA) or an application-specific device. The computing device 800 may also be implemented as a personal computer including tablet computer, laptop computer, and/or non-laptop computer configurations, or a server computer including both rack-mounted server computer and blade server computer configurations.

Embodiments described in the present disclosure may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

One skilled in the art will appreciate that, for this and other processes and methods disclosed in the present disclosure, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in the present disclosure, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general-purpose hardware), specific hardware implementations or a combination of software and specific hardware implementations are also possible and contemplated. In this description, a "computing entity" may be any computing system as previously defined in the present disclosure, or any module or combination of modulates running on a computing system.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as "an aspect" may refer to one or more aspects and vice versa. A phrase such as "an embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such "an embodiment" may refer to one or more embodiments and vice versa. A phrase such as "a configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as "a configuration" may refer to one or more configurations and vice versa.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Moreover, nothing disclosed in the present disclosure is intended to be dedicated to the public regardless of whether such disclosure is explicitly recited in the above description.

The present disclosure is not to be limited in terms of the particular embodiments described in the present disclosure, which are intended as illustrations of various aspects. Many modifications and variations can be made without departing from its spirit and scope. Functionally equivalent methods and apparatuses within the scope of the disclosure, in addition to those enumerated in the present disclosure, are possible from the foregoing descriptions. Such modifications and variations are intended to fall within the scope of this disclosure. Also, the terminology used in the present disclosure is for the purpose of describing particular embodiments only, and is not intended to be limiting.

With respect to the use of substantially any plural and/or singular terms in the present disclosure, those having skill in the art can translate from the plural to the singular and/or from the singular to the plural as is appropriate to the context and/or application. The various singular/plural permutations may be expressly set forth in the present disclosure for the sake of clarity.

In general, terms used in the present disclosure, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that include A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

For any and all purposes, such as in terms of providing a written description, all ranges disclosed in the present disclosure also encompass any and all possible sub ranges and combinations of sub ranges thereof. Any listed range can be easily recognized as sufficiently describing and enabling the same range being broken down into at least equal halves, thirds, quarters, fifths, tenths, and/or others. As a non-limiting example, each range discussed in the present disclosure can be readily broken down into a lower third, middle third and upper third, etc. All language such as "up to," "at least," and the like include the number recited and refer to ranges which can be subsequently broken down into sub ranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various embodiments of the present disclosure have been described in the present disclosure for purposes of illustration, and various modifications may be made without departing from the scope and spirit of the present disclosure. Accordingly, the various embodiments disclosed in the present disclosure are not intended to be limiting.

What is claimed is:

1. A method to alter how source data is displayed within a user interface, the method comprising:
    obtaining source data that is representative of a cloud infrastructure that performs cloud computing activities that are associated with a user of the cloud infrastructure, the source data organized into a plurality of layers of information that each describe a different categorizable aspect of the cloud infrastructure, the source data also including:
        use information describing particular components of the cloud infrastructure that are used in relation to the cloud computing activities, and
        containment information that describes relationships between the particular components;
    displaying, via a display screen, a visualization of the source data within a user interface, the visualization including a top-level structure view representative of the cloud infrastructure as indicated by the use information and the containment information of the source data;
    receiving, via the user interface, a first user input effective to select portions of the source data to be included in the visualization of the source data displayed within the user interface, the portions to be included relating to one or more aspects of the cloud infrastructure and corresponding to at least two layers of the plurality of layers of information, wherein the plurality of layers includes at least one layer disposed between the at least two layers and wherein the first user input indicates to hide the at least one layer;
    receiving, via the user interface, a second user input effective to select a type of connection between the particular components that are part of the selected portions of the source data, wherein the second user input indicates that the type of connection is to be included in the visualization of the source data displayed within the user interface;
    identifying a plurality of connections between the particular components, wherein:
        the plurality of connections are identified based on the containment information associated with the portions of the source data selected according to the first user input, the type of connection between the particular components selected according to the second user input, and the layers of the plurality of layers of information to be included in the visualization corresponding to the selected portions of the source data;
        a particular connection of the plurality of connections between a first particular component and a second particular component of the particular components is based on a first intermediary connection and a second intermediary connection;
        the first intermediary connection is between the first particular component and an intermediary component of the at least one layer indicated to be hidden by the first user input; and
        the second intermediary connection is between the second particular component and the intermediary component; and
    altering the visualization of the source data within the user interface based on the first user input and according to the second user input, the altering including:
        depicting the particular components and the identified plurality of connections;
        depicting the particular connection while hiding the intermediary component, the first intermediary connection, and the second intermediary connection, wherein hiding the intermediary component, the first intermediary connection, and the second intermediary connection is based on the intermediary component being included in the at least one layer indicated to be hidden by first user input; and
        hiding one or more other portions of the source data that, as indicated by the first user input and the second user input, are not to be included in the visualization displayed within the user interface, wherein the second user input indicates a first portion of the source data is to be a start point and a second portion of the source data is to be an end point for displaying the associations of the portions of the source data within the visualization of the source data.

2. The method of claim 1 further comprising:
    receiving, via the user interface, a third user input effective to select one or more subsets of the at least two layers that are to be added to the visualization of the source data being displayed; and
    further altering the visualization of the source data within the user interface according to the third user input.

3. The method of claim 1 further comprising:
    receiving, via the user interface, a third user input effective to select one or more subsets of the at least two layers to be hidden in the visualization of the source data being displayed; and
    further altering the visualization of the source data within the user interface according to the third user input.

4. The method of claim 2, further comprising:
    determining one or more portions of the source data to be hidden in the visualization of the source data within the user interface according to the third user input.

5. The method of claim 1 further comprising associating, in the visualization of the source data within the user interface, two or more portions of the source data in two or more layers of the source data based on information in one or more layers of information that are hidden in the visualization of the source data.

6. The method of claim 1, wherein the source data further comprises a plurality of perspectives including paths associating all of the portions of the source data and altering the visualization of the source data comprises altering which of the associations-of the portions of the source data are included in the visualization of the source data being displayed.

7. One or more non-transitory computer-readable storage media having computer-executable instructions stored thereon that are executable by a processor device to perform or control performance of operations comprising:
obtaining source data that is representative of a cloud infrastructure that performs cloud computing activities that are associated with a user of the cloud infrastructure, the source data organized into a plurality of layers of information that each describe a different categorizable aspect of the cloud infrastructure, the source data also including:
use information describing particular components of the cloud infrastructure that are used in relation to the cloud computing activities, and
containment information that describes relationships between the particular components;
displaying, via a display screen, a visualization of the source data within a user interface, the visualization including a top-level structure view representative of the cloud infrastructure as indicated by the use information and the containment information of the source data;
receiving, via the user interface, a first user input effective to select portions of the source data to be included in the visualization of the source data displayed within the user interface, the portions to be included relating to one or more aspects of the cloud infrastructure and corresponding to at least two layers of the plurality of layers of information, wherein the plurality of layers includes at least one layer disposed between the at least two layers and wherein the first user input indicates to hide the at least one layer;
receiving, via the user interface, a second user input effective to select a type of connection between the particular components that are part of the selected portions of the source data, wherein the second user input indicates that the type of connection is to be included in the visualization of the source data displayed within the user interface;
identifying a plurality of connections between the particular components, wherein:
the plurality of connections are identified based on the containment information associated with the portions of the source data selected according to the first user input, the type of connection between the particular components selected according to the second user input, and the layers of the plurality of layers of information to be included in the visualization corresponding to the selected portions of the source data;
a particular connection of the plurality of connections between a first particular component and a second particular component of the particular components is based on a first intermediary connection and a second intermediary connection;
the first intermediary connection is between the first particular component and an intermediary component of the at least one layer indicated to be hidden by the first user input; and
the second intermediary connection is between the second particular component and the intermediary component; and
altering the visualization of the source data within the user interface based on the first user input and according to the second user input, the altering including:
depicting the particular components and the identified plurality of connections;
depicting the particular connection while hiding the intermediary component, the first intermediary connection, and the second intermediary connection, wherein hiding the intermediary component, the first intermediary connection, and the second intermediary connection is based on the intermediary component being included in the at least one layer indicated to be hidden by first user input; and
hiding one or more other portions of the source data that, as indicated by the first user input and the second user input, are not to be included in the visualization displayed within the user interface, wherein the second user input indicates a first portion of the source data is to be a start point and a second portion of the source data is to be an end point for displaying the associations of the portions of the source data within the visualization of the source data.

8. The one or more non-transitory computer-readable storage media of claim 7, the operations further comprising:
receiving, via the user interface, a third user input effective to select one or more subsets of the at least two layers that are to be added to the visualization of the source data being displayed; and
further altering the visualization of the source data within the user interface according to the third user input.

9. The one or more non-transitory computer-readable storage media of claim 7, the operations further comprising:
receiving, via the user interface, a third user input effective to select one or more subsets of the at least two layers to be hidden in the visualization of the source data being displayed; and
further altering the visualization of the source data within the user interface according to the third user input.

10. The one or more non-transitory computer-readable storage media of claim 7, the operations further comprising:
determining one or more portions of the source data to be hidden in the visualization of the source data within the user interface according to the second user input.

11. The one or more non-transitory computer-readable storage media of claim 7, the operations further comprising associating, in the visualization of the source data within the user interface, two or more portions of the source data in two or more layers of the source data based on information in one or more layers of information that are hidden in the visualization of the source data.

12. The one or more non-transitory computer-readable storage media of claim 7, wherein the source data further comprises a plurality of perspectives including paths associating all of the portions of the source data and altering the visualization of the source data comprises altering which of the associations of the portions of the source data are included in the visualization of the source data being displayed.

13. A system comprising:
one or more processors configured to cause performance of operations comprising:

obtaining source data that is representative of a cloud infrastructure that performs cloud computing activities that are associated with a user of the cloud infrastructure, the source data organized into a plurality of layers of information that each describe a different categorizable aspect of the cloud infrastructure, the source data also including:
  use information describing particular components of the cloud infrastructure that are used in relation to the cloud computing activities, and
  containment information that describes relationships between the particular components;
displaying, via a display screen, a visualization of the source data within a user interface, the visualization including a top-level structure view representative of the cloud infrastructure as indicated by the use information and the containment information of the source data;
receiving, via the user interface, a first user input effective to select portions of the source data to be included in the visualization of the source data displayed within the user interface, the portions to be included relating to one or more aspects of the cloud infrastructure and corresponding to at least two layers of the plurality of layers of information, wherein the plurality of layers includes at least one layer disposed between the at least two layers and wherein the first user input indicates to hide the at least one layer;
receiving, via the user interface, a second user input effective to select a type of connection between the particular components that are part of the selected portions of the source data, wherein the second user input indicates that the type of connection is to be included in the visualization of the source data displayed within the user interface;
identifying a plurality of connections between the particular components, wherein:
  the plurality of connections are identified based on the containment information associated with the portions of the source data selected according to the first user input, the type of connection between the particular components selected according to the second user input, and the layers of the plurality of layers of information to be included in the visualization corresponding to the selected portions of the source data;
  a particular connection of the plurality of connections between a first particular component and a second particular component of the particular components is based on a first intermediary connection and a second intermediary connection;
  the first intermediary connection is between the first particular component and an intermediary component of the at least one layer indicated to be hidden by the first user input; and
  the second intermediary connection is between the second particular component and the intermediary component; and
altering the visualization of the source data within the user interface based on the first user input and according to the second user input, the altering including:
  depicting the particular components and the identified plurality of connections;
  depicting the particular connection while hiding the intermediary component, the first intermediary connection, and the second intermediary connection, wherein hiding the intermediary component, the first intermediary connection, and the second intermediary connection is based on the intermediary component being included in the at least one layer indicated to be hidden by first user input; and
  hiding one or more other portions of the source data that, as indicated by the first user input and the second user input, are not to be included in the visualization displayed within the user interface, wherein the second user input indicates a first portion of the source data is to be a start point and a second portion of the source data is to be an end point for displaying the associations of the portions of the source data within the visualization of the source data.

14. The system of claim 13, the operations further comprising:
receiving, via the user interface, a third user input effective to select one or more subsets of the at least two layers that are to be added to the visualization of the source data being displayed; and
further altering the visualization of the source data within the user interface according to the third user input.

15. The system of claim 13, the operations further comprising:
receiving, via the user interface, a third user input effective to select one or more subsets of the at least two layers to be hidden in the visualization of the source data being displayed; and
further altering the visualization of the source data within the user interface according to the third user input.

16. The system of claim 13, the operations further comprising:
determining one or more portions of the source data to be hidden in the visualization of the source data within the user interface according to the second user input.

17. The system of claim 13, wherein the source data further comprises a plurality of perspectives including paths associating all of the portions of the source data and altering the visualization of the source data comprises altering which of the associations of the portions of the source data are included in the visualization of the source data being displayed.

* * * * *